UNITED STATES PATENT OFFICE.

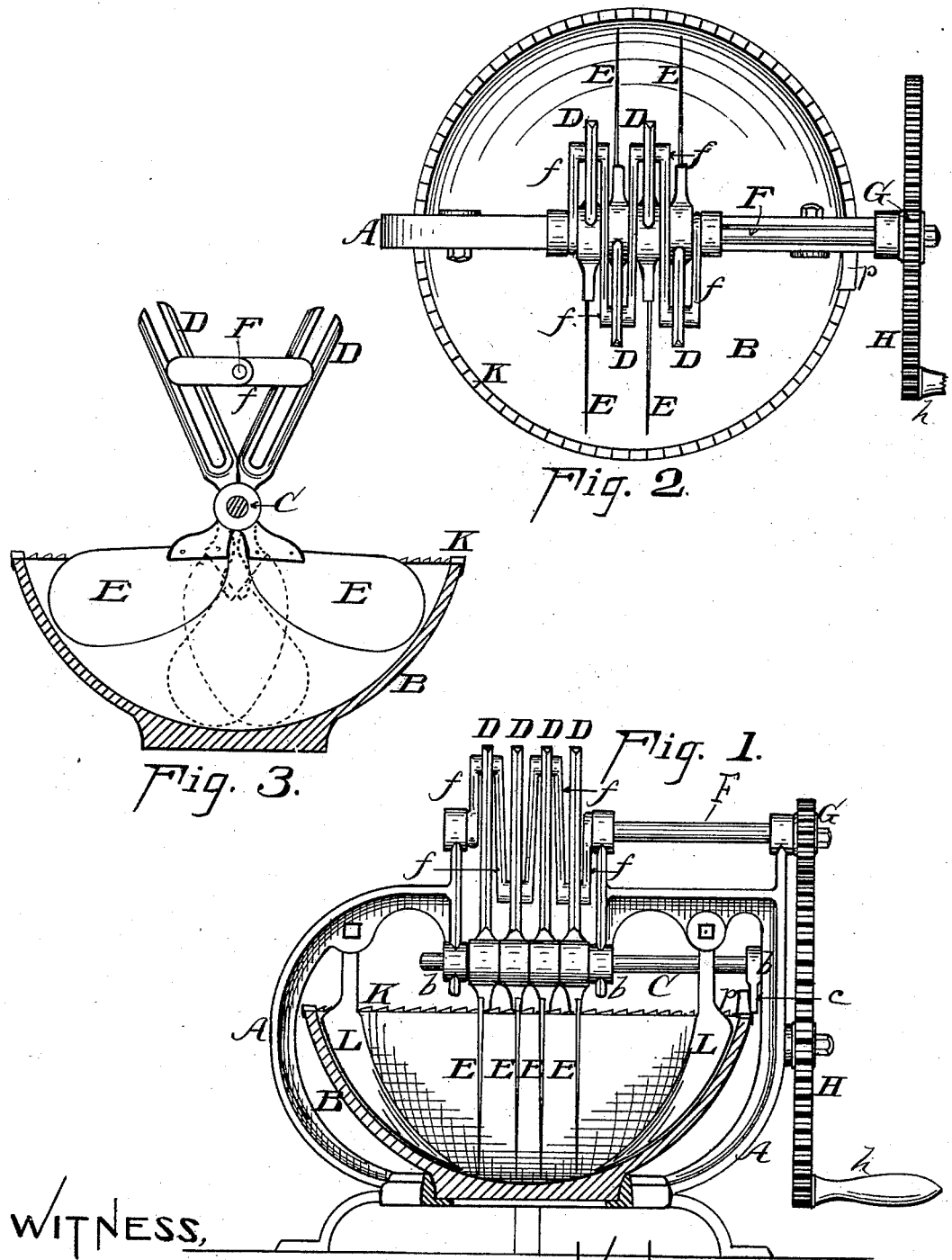

SAMUEL T. JULL, OF MEADVILLE, PENNSYLVANIA, ASSIGNOR OF ONE-HALF TO FARNUM T. FISH, OF SAME PLACE.

MEAT-CUTTER.

SPECIFICATION forming part of Letters Patent No. 426,413, dated April 22, 1890.

Application filed July 9, 1889. Serial No. 316,933. (No model.)

*To all whom it may concern:*

Be it known that I, SAMUEL T. JULL, a citizen of the United States, residing at Meadville, in the county of Crawford and State of Pennsylvania, have invented certain new and useful Improvements in Meat-Cutting Machines, of which the following is a specification.

This invention relates to a machine for cutting up meats; and it consists of a slowly-rotating bowl and a set of shear cutting oscillating knives arranged with mechanism for operating the same, constructed and combined substantially as hereinafter described, and pointed out in the claims.

In the accompanying drawings, Figure 1 is a side elevation, partly in section, of my new machine for cutting up meat. Fig. 2 is a top or plan view of the same. Fig. 3 is a detached view of the knives and the bowl in section, showing the position and movements of the knives therein.

A is a frame having a ring-base $a$, in which a bowl B rests and supported upon suitable feet. In the upper part of the frame over the bowl is arranged the cutting mechanism. In bearings $b\ b\ b$ of the frame is provided a rock-shaft C, and on said shaft between the central bearings are fulcrumed a series of levers D D, to the lower ends of which are attached cutting-blades E E. The upper parts of said levers are bifurcated, as seen in Fig. 3. In bearings in the frame above those for the aforesaid rock-shaft is placed a rotary crank-shaft F. The cranks $f\ f$ are made in alternate opposite positions on the shaft, as shown in Figs. 1 and 2, and said cranks play in the bifurcated arms of the said levers D D, by means of which as the crank-shaft rotates a reciprocatory movement is imparted to said levers. On the outer end of crank-shaft F is fixed a pinion G, and beneath it is journaled on a suitable bearing-pin a driving gear-wheel H, meshing with said pinion, the wheel being provided with a handle $h$ for turning same. On the top edge of the bowl is fixed an annular rack-bar K, and to the rock-shaft C is attached a short crank-arm $c$, to which is pivoted a pawl $p$, engaging with the said rack-bar K, by which the reciprocating movements of the rock-shaft transmit an intermittent rotary movement to the bowl, whose base turns in the ring-base $a$ of the frame A. To the frame are also attached adjustable scrapers L L, reaching down the inside surface of the bowl, the purpose of which is to remove the contents of the bowl from the sides and throw it inward toward the center, where the knives are in operation.

From the foregoing it will be seen that the operations of this machine are as follows: The meat to be cut up is placed in the bowl in pieces. Now, by turning the driving-wheel H a quick swinging movement is imparted to the levers D D by the cranks $f\ f$ of shaft F, whereby the cutting-blades are made to perform a reciprocating shear cutting movement within the bowl, as seen in Fig. 3, in opposing directions. Thus the knives in pairs are made to cut oppositely to one another. At the same time the bowl is slowly rotated by the pawl $p$, thereby changing constantly the position of the contents of the bowl to the knives.

Having described my invention, what I claim, and desire to secure by Letters Patent, is—

1. In a meat-cutting machine, a rotating bowl B, provided with an annular rack-bar on its top edge, bifurcated levers D, mounted on rock-shaft C, reciprocating knives E, attached to said levers D, multiple-crank shaft F, rock-shaft C, crank-arm $c$, and pawl $p$, all constructed and combined to operate substantially as described.

2. In a meat-cutting machine, a rotating bowl B, provided with an annular rack-bar on its top edge, bifurcated levers D, mounted on rock-shaft C, reciprocating knives E, attached to said levers D, multiple-crank shaft F, rock-shaft C, crank-arm $c$, pawl $p$, and scrapers L, all constructed and combined to operate substantially as described.

SAMUEL T. JULL.

Witnesses:
WM. C. FISH,
J. H. CULBERTSON.